United States Patent [19]
Wakabayashi et al.

[11] Patent Number: 5,162,839
[45] Date of Patent: Nov. 10, 1992

[54] CAMERA HAVING A LIGHT PRESS TIMER

[75] Inventors: Tsutomu Wakabayashi; Naoki Tomino, both of Tokyo; Tetsuro Goto, Funabashi; Masaaki Yanagisawa, Tokyo; Yoshio Matsuzawa, Yokohama, all of Japan

[73] Assignee: Nikon Corporation, Tokyo, Japan

[21] Appl. No.: 830,451

[22] Filed: Feb. 5, 1992

Related U.S. Application Data

[63] Continuation of Ser. No. 718,903, Jun. 24, 1991, abandoned, which is a continuation of Ser. No. 620,747, Dec. 3, 1990, abandoned.

[30] Foreign Application Priority Data

Dec. 5, 1989 [JP] Japan .................................. 1-315670

[51] Int. Cl.⁵ .............................................. G03B 7/26
[52] U.S. Cl. .................................. 354/484; 354/267.1
[58] Field of Search ...................... 354/266, 262.1, 484

[56] References Cited

U.S. PATENT DOCUMENTS 4,387,977  6/1983  Uchidoi et al. ...................... 354/484
4,553,140  11/1985  Maida .................................. 354/484

Primary Examiner—Russell E. Adams
Assistant Examiner—David M. Gray
Attorney, Agent, or Firm—Shapiro and Shapiro

[57] ABSTRACT

A camera comprising a light press timer for maintaining a power source until a predetermined power source maintaining time elapses even if the power source is switched on by the half depression operation of a release button and the half depression operation is released, a time counting device for starting time counting with photographing, a memory device for finding the photographing interval time from the preceding photographing till the current photographing from the result of the time counting by the time counting device each time photographing is effected and memorizing it, and a determining device for determining a predetermined power source maintaining time from the memorized photographing interval time.

15 Claims, 10 Drawing Sheets

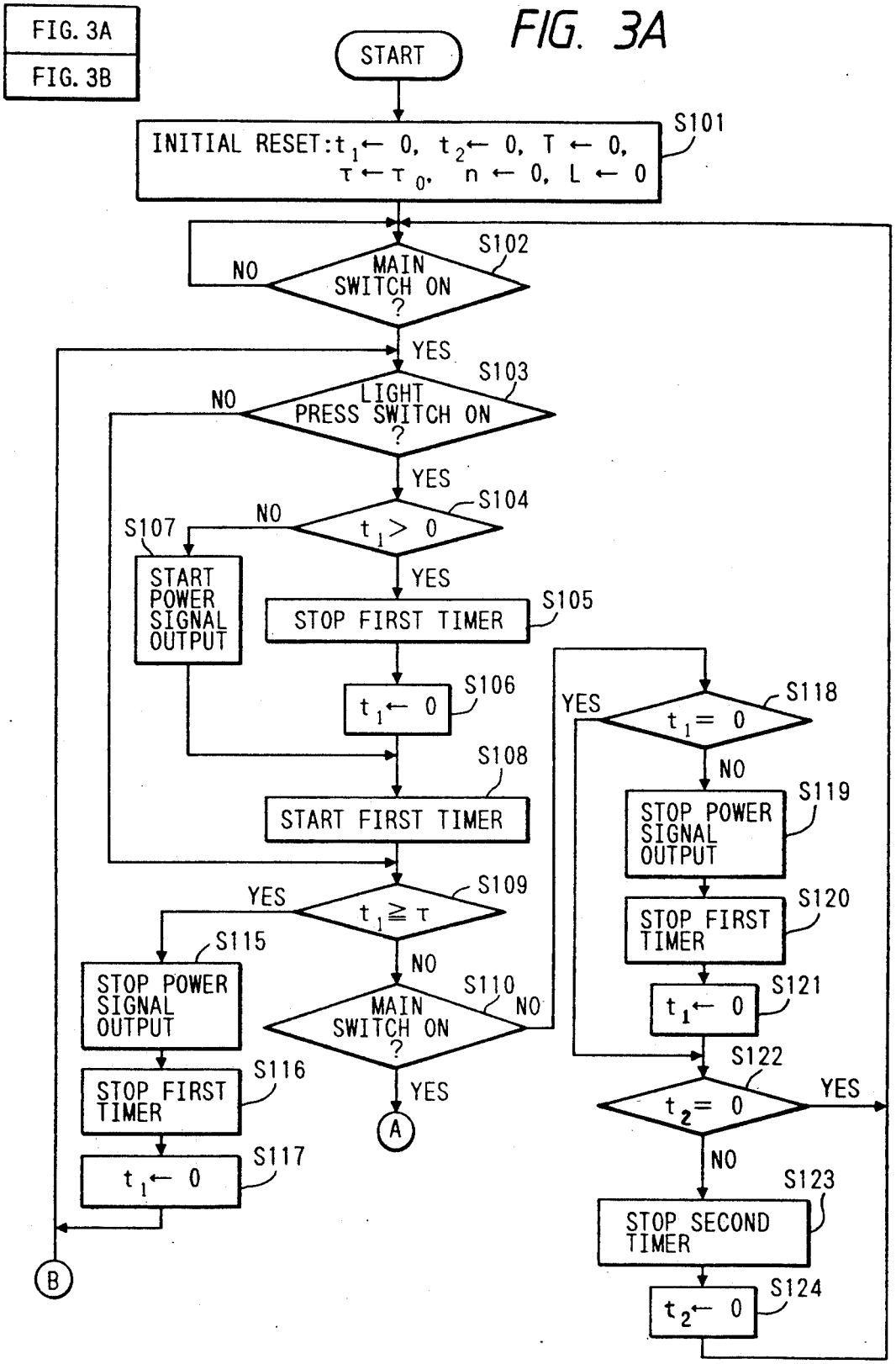

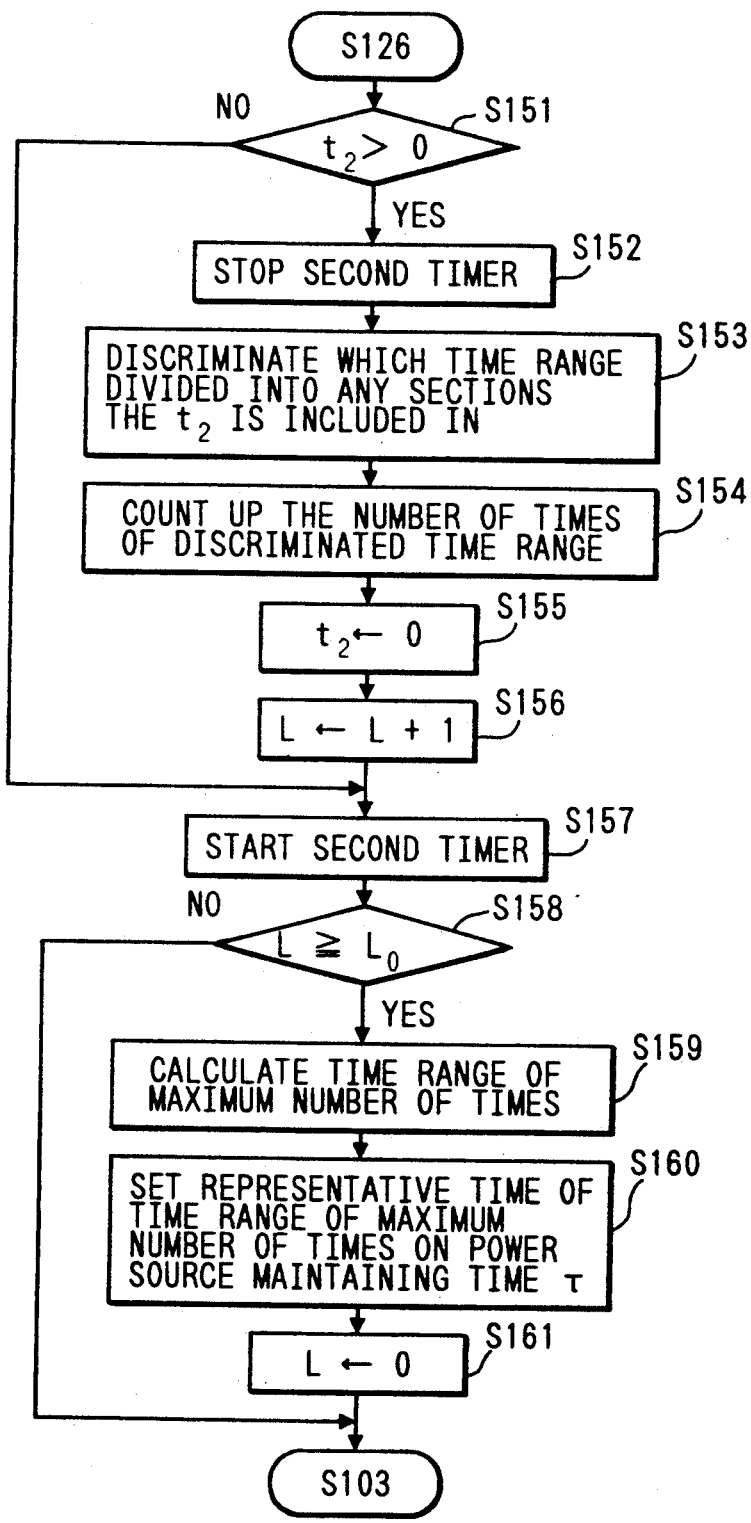

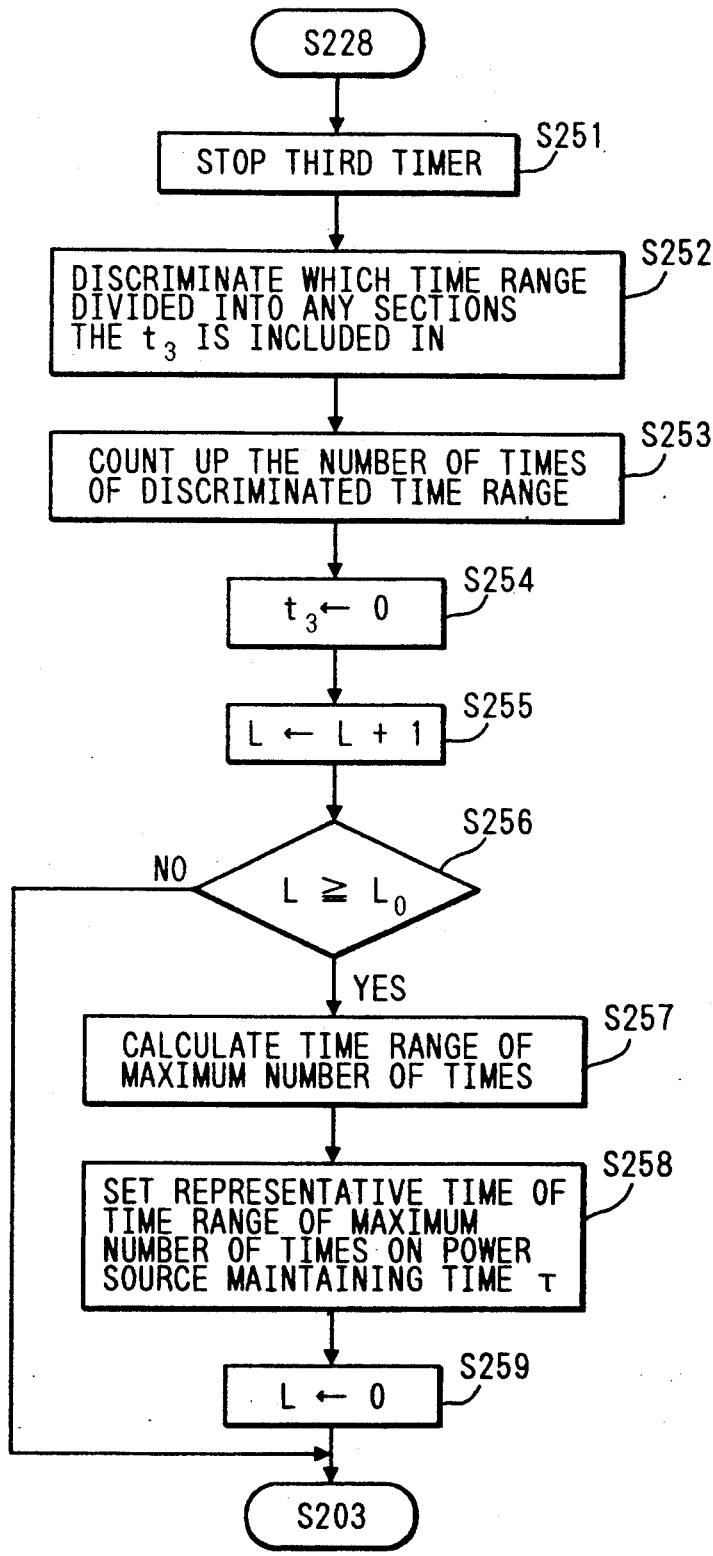

CAMERA HAVING A LIGHT PRESS TIMER

This is a continuation of application Ser. No. 718,903 filed Jun. 24, 1991, which is a continuation of application Ser. No. 620,747 filed Dec. 3, 1990, both now abandoned.

BACKGROUND OF THE INVENTION

1. Field of the Invention

This invention relates to a camera having a light press timer.

2. Related Background Art

In an ordinary AE camera, when a release button is operated (half-depressed) to a predetermined position short of the release position, a light press switch is closed, whereby a light metering circuit in the camera is operated to detect the luminance of an object to be photographed. There is also known a camera in which an exposure value (such as an aperture value or a shutter speed) calculated on the basis of the luminance of the object to be photographed is displayed on a liquid crystal display device or the like, for example, through a display circuit. The light press timer is one which maintains the power source until a predetermined power source maintaining time (e.g. 8 seconds) elapses even if the half depression operation is thereafter released and the light press switch is opened. Accordingly, even after the release of the half depression, the display of the exposure value is continuedly effected for a predetermined time and therefore, this is convenient when manually adjusting the aperture value or the shutter speed (adjusting the exposure) while watching, for example, the exposure value.

However, if the above-mentioned power source maintaining time is set to a short time, the timer is switched off to extinguish the display before the exposure adjustment is completed and therefore, the half depression operation must be performed again, and this means poor usability. So, if the power source maintaining time is made uniformly long, the above-noted problem will be solved, but in this case, there is still the problem that even after photographing or after photographing is discontinued due to a variation in the luminance of the object to be photographed, the power source is unnecessarily maintained and the battery is wastefully consumed.

SUMMARY OF THE INVENTION

It is an object of the present invention to provide a camera having a light press timer in which the power source maintaining time of the light press timer can be set to a time best suited for the photographer.

The present invention is applied to a camera having a light press timer in which even if a power source is switched on by the photographing preparation operation such as the half depression operation of a release button and this half depression operation is released, the power source is maintained until a predetermined power source maintaining time elapses.

One embodiment of the invention described with reference to FIG. 1A of the accompanying drawings, is provided with a time counting device 101 adapted to start time counting with photographing, a memory device 102 for finding the photographing interval time from the preceding photographing till the current photographing from the result of the time counting by the time counting device 101 each time photographing is effected and memorizing the photographing interval time, and a determining device 103 for determining said predetermined power source maintaining time from the memorized photographing interval time.

Another embodiment, as shown in FIG. 1B of the accompanying drawings, is provided with a time counting device 201 responsive to the photographing preparation operation to start time counting, a memory device 202 for finding the photographing preparation time from the start of the half depression operation till photographing from the result of the time counting by the time counting device 201 each time photographing is effected and memorizing the photographing preparation time, and a determining device 203 for determining said predetermined power source maintaining time from the memorized photographing preparation time.

Each time photographing is effected, the memory device 102 finds the photographing interval time from the preceding photographing till the current photographing from the result of the time counting by the time counting device 101 and memorizes it. The determining device 103 determines the predetermined power source maintaining time from the memorized photographing interval time. When the photographing preparation operation is thereafter performed, the power source is maintained until said determined power source maintaining time elapses even if the photographing preparation operation is released. Thereby, it becomes possible to set the power source maintaining time of the timer to a time best suited for the photographer.

Each time photographing is effected, the memory device 202 finds the photographing preparation time from the start of the half depression operation till photographing from the result of the time counting by the time counting device 201 and memorizes it. The determining device 203 determines said predetermined power souce maintaining time from the memorized photographing preparation time. Thereby, it becomes possible to set the power source maintaining time of the timer to a time best suited for the photographer, as described above.

The photographing preparation operation includes not only the operation of the light press switch, but also the contact with a touch sensor proximate to a release button which will be described later.

BRIEF DESCRIPTION OF THE DRAWINGS

FIGS. 2, 3, 3A and 3B show the first embodiment of the present invention in greater detail, FIG. 2 being a block diagram showing the control system of a camera according to the present invention, and FIG. 3 being a flow chart of the processing procedure.

FIGS. 4 and 5 are flow charts showing modifications of the processing procedure.

FIGS. 7 and 8 are flow charts showing modifications.

DESCRIPTION OF THE PREFERRED EMBODIMENTS

First Embodiment

A first embodiment of the present invention will hereinafter be, described with reference to FIGS. 2, 3, 3A and 3B.

Figure 1A:
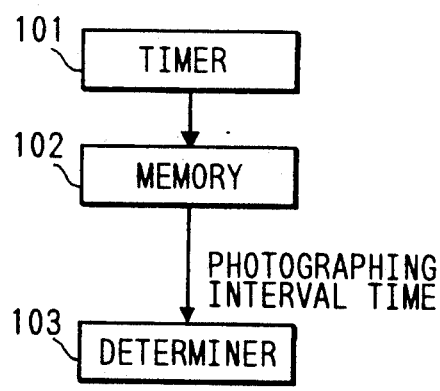
FIGS. 1A and 1B are diagrams corresponding to first and second embodiments, respectively.
Figure 1B:
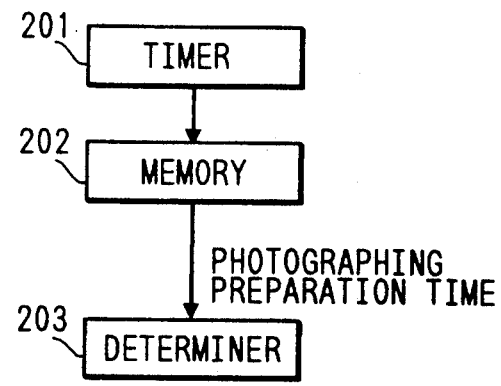
Figure 2:
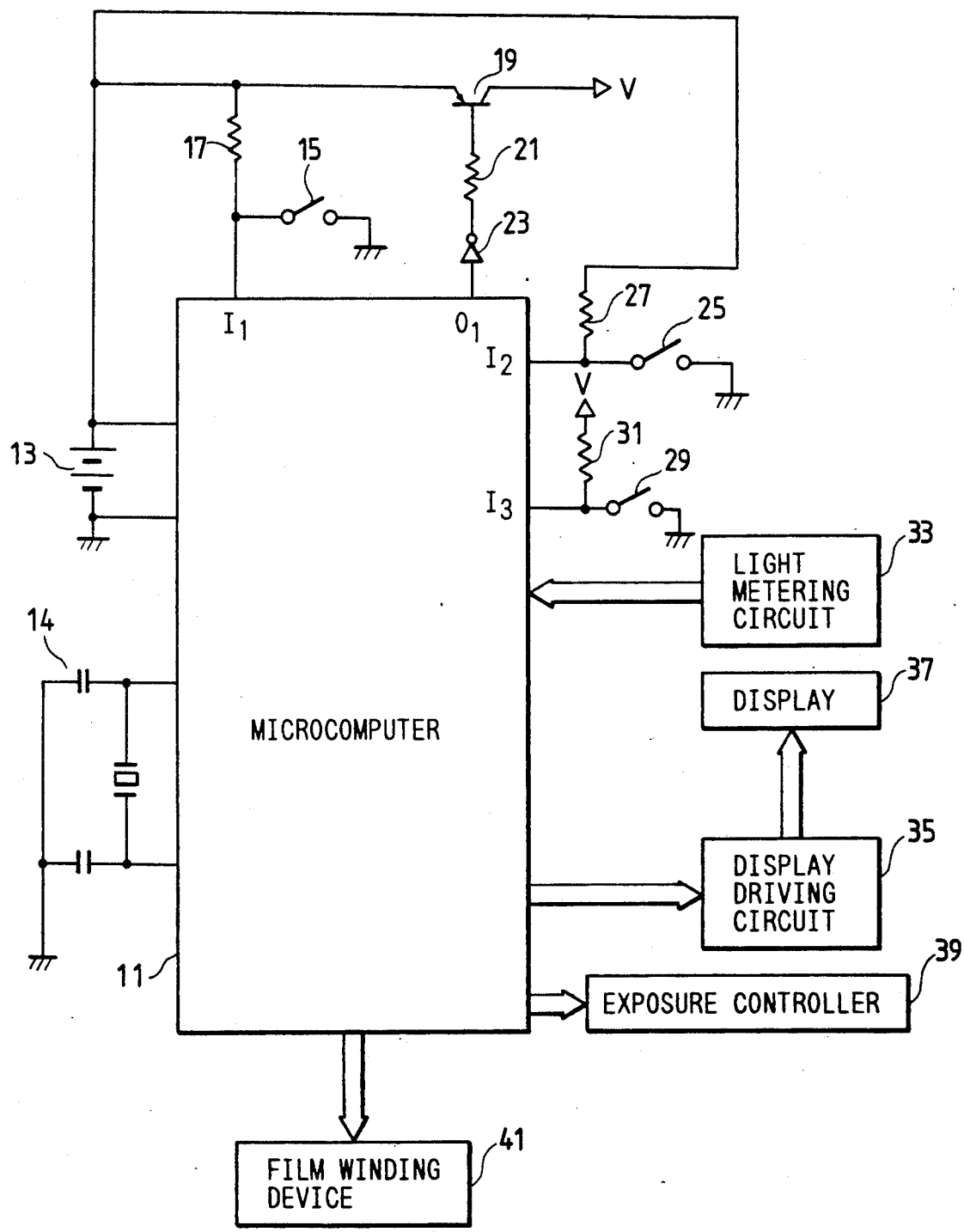

FIG. 2 is a block diagram of a camera according to the present invention. The reference numeral 11 designates a microcomputer which is supplied with electric power by a battery 13 and provides for clock pulses necessary for calculating process and time counting by a reference oscillation source 14 and an oscillation circuit (not shown) contained in the microcomputer 11.

The reference numeral 15 denotes a main switch having one end thereof grounded and having the other end thereof connected to the plus side of the battery 13 through a resistor 17 and also connected to the input port $I_1$ of the microcomputer 11. When this main switch 15 is OFF, the camera may not start its operation.

The reference numeral 19 designates a PNP transistor having the emitter thereof connected to the plus side of the battery 13 and having the base thereof connected to the output port $O_1$ of the microcomputer 11 through a resistor 21 and an inverter 23. The collector of the transistor 19 provides a power source line V for supply of electric power to a switch, circuits, etc. which will be described later. When the output port $O_1$ of the microcomputer 11 assumes a high level, the base of the transistor 19 assumes a low level by the action of the inverter 23, whereby the transistor 19 is turned on and the switch, the circuits etc. which will be described later are supplied with electric power.

Here, causing the output port $O_1$ of the microcomputer 11 to assume a high level and turning on the transistor 19 is referred to as the outputting of a power signal, and changing the output port $O_1$ from a high level to a low level and turning off the transistor 19 is referred to as the stoppage of the outputting of the power signal.

The reference numeral 25 denotes a light press switch (a power source switch) having one end thereof grounded and having the other end thereof connected to the plus side of the battery 13 through a pull-up resistor 27 and also connected to the input port $I_2$ of the microcomputer 11. The light press switch 25 is adapted to be closed with depression (half depression operation,) deeper than a position past the half-depressed position of a release button, not shown, and if the aforementioned main switch 15 is ON, the power source of the camera may be maintained for a predetermined power source maintaining time by the closing of the light press switch 25.

In the present embodiment, the stroke of the release button is divided into two stages, and the light press switch is closed by the first stage stroke of the release button. However, the construction of the light press switch is not restricted to the above-described construction, but where for example, a touch sensor is disposed around the release button, this touch sensor provides a light press switch. By putting a finger on the release button, whereby the finger also touches the touch sensor, it is possible to output a signal.

The reference numeral 29 designates a release switch having one end thereof grounded and having the other end thereof connected to the collector of the transistor 19, i.e., the power source line V, through a pull-up resistor 31 and also connected to the input port $I_3$ of the microcomputer 11. The release switch 29 is closed by the depression of the above-described release button to a release position past the half-depressed position, and when the release switch 29 is closed during the closing of the main switch 15, photographing is started. The light press switch 25 is also ON when the release button is depressed to the release position.

The reference numeral 33 denotes a light metering circuit which receives light from an object to be photographed by a light receiving element (not shown) and amplifies it, and thereafter converts it into a digital signal and outputs it as the object luminance to the microcomputer 11. The reference numeral 35 designates a display driving circuit responsive to a display signal from the microcomputer 11 to drive a display device 37 comprising an LED, liquid crystal or the like and cause the display device 37 to display a shutter speed, an aperture value or the like. The reference numeral 39 denotes an exposure controller for driving a shutter, a diaphragm or an aperture controller. The exposure controller 39 is responsive to the command of the microcomputer 11 to drive the diaphragm and the shutter on the basis of a predetermined aperture value and a predetermined shutter speed. The reference numeral 41 designates a film winding device comprised of a motor, a spool, a sprocket and a gear. The film winding device 41 is responsive to the command of the microcomputer 11 to wind up film by one frame.

The light metering circuit 33, the display driving circuit 35, the display device 37, the exposure controller 39 and the film winding device 41 are all connected to the collector of the transistor 19 so that they may be supplied with electric power from the power source line V.

As described above, the switches and circuits than the main switch 15, the transistor 19 and the light press switch 25 which are a minimum necessary for control are all adapted to be supplied with electric power from the power source line V, and are designed such that their power consumption is minimized when the transistor 19 is OFF.

The procedure of the control by the microcomputer 11 will now be described with reference to the flow chart of FIGS. 3, 3A, and 3B.

Figure 3B:
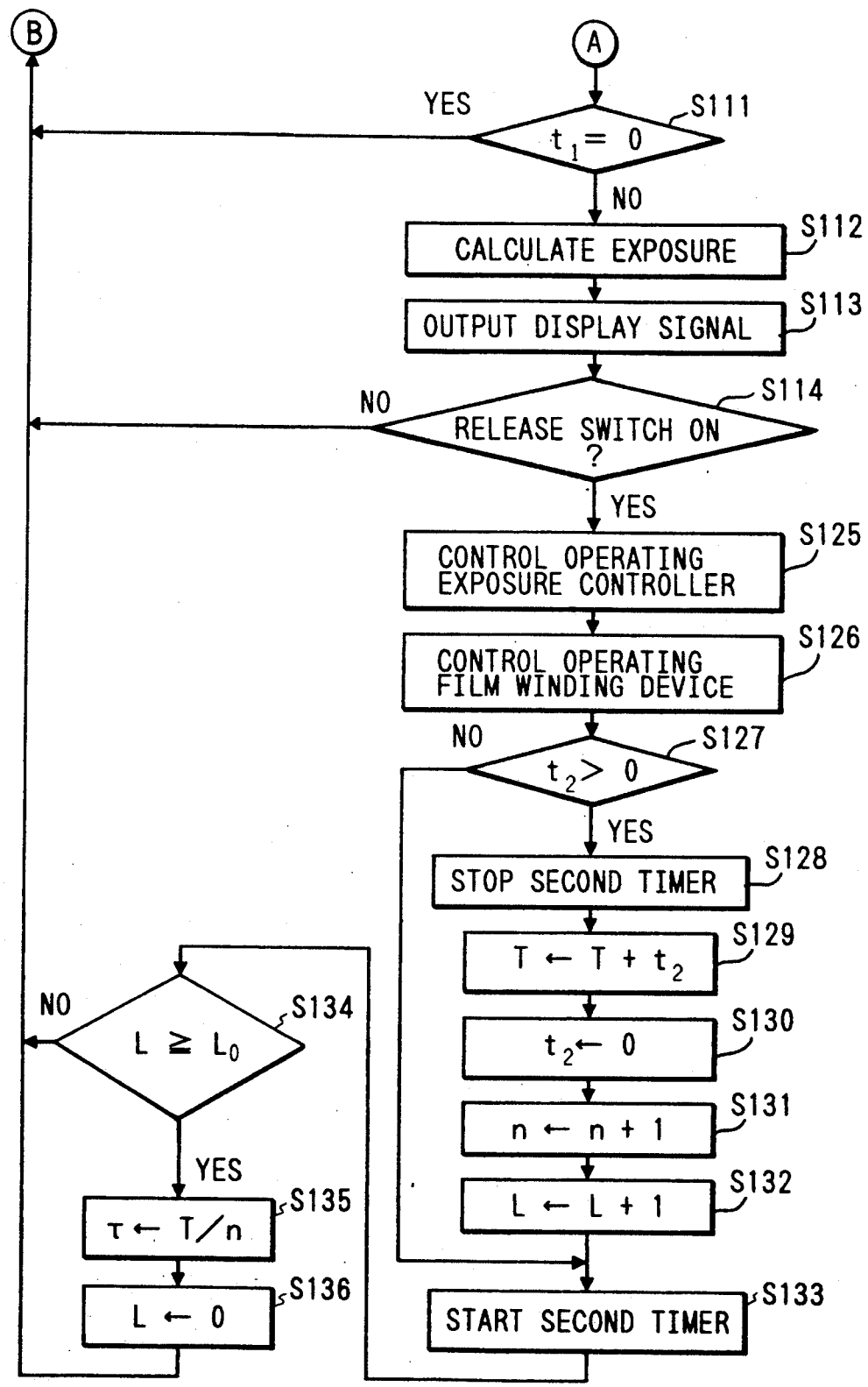

When the camera is loaded with the battery 13, the program of FIGS. 3, 3A, and 3B is started, and first at a step S101, initial resetting is effected. That is, the first timer time $t_1$, the second timer time $t_2$ and the cumulative photographing interval time T of the internal memory of the microcomputer 11 are reset to 0 and also the power source maintaining time $\tau$ is set to a predetermined initial time (e.g. a time of the order of 8 seconds) $\tau_0$. Also, the number of times of time counting and photographing n and the number of times of counting L are reset to 0.

Here, the first timer time $t_1$ is for counting the power source maintaining time $\tau$, and the second timer time $t_2$ is for counting the photographing interval time from the current photographing till the next photographing to obtain the cumulative photographing interval time T. The number of times of time counting and photographing n is the count value of the number of times over which the photographing interval time has been counted, and the number of times of counting L is a value used to determine the number of times of time counting and photographing n for each predetermined number of times $L_0$.

Subsequently, at a step S102, whether the main switch 15 is ON is judged from the state of the input port $I_1$. If the input port $I_1$ is at a high level, it is judged that the main switch 15 is OFF, and the program stays at the step S102, and if the input port $I_1$ is at a low level, it is judged that the main switch 15 is ON, and advance is made to a step S103. At the step S103, whether the light press switch 25 is ON is judged from the state of the input port $I_2$. If the input port $I_2$ is at a high level, it is judged that the light press switch 25 is OFF, and the program jumps to a step S109, and if the input port $I_2$ is at a low level, it is judged that the light press switch 25 is ON, and the program proceeds to a step S104.

At the step S104, whether the first timer time $t_1$ is greater than 0 is judged, and if the answer is affirmative, it is judged that the first time counting is already effected, and advance is made to a step S105. At the step S105, the first time counting is stopped, and then at a step S106, the first timer time $t_1$ is reset to 0 and advance is made to a step S108.

On the other hand, if the step S104 is negated, that is, if it is judged that the first timer time $t_1$ is 0, it is judged that the first time counting is not effected, and advance is made to a step S107, where the output port $O_1$ is set to a high level and the transistor 19 is turned on, and advance is made to the step S108. That is, the outputting of the power signal is started. Thereby electric power is supplied from the power source V to the above-described circuits, which thus become operable. At the step S108, the first time counting is started, and then advance is made to a step S109.

At the step S109, the first timer time $t_1$ and the power source maintaining time $\tau$ are compared with each other, and if it is judged that the first timer time $t_1$ is smaller than the power source maintaining time $\tau$, advance is made to a step S110. At the step S110, whether the main switch 15 is ON is judged from the state of the input port $I_1$, and if the input port $I_1$ is at a low level, it is judged that the main switch 15 is ON, and advance is made to a step S111. At the step S111, whether the first timer time $t_1$ is 0 is judged, and if it is 0, it is judged that the power source is not maintained, and return is made to the step S103, and if the first timer time $t_1$ is not 0, it is judged that the power source is maintained, and advance is made to a step S112.

At the step S112, the object luminance from the light metering circuit 33 is input and the sensitivity of the loaded film is input from a film sensitivity setting device, not shown, and an exposure value is calculated from the object luminance and the film sensitivity and exposure factors such as a shutter speed and an aperture value or the number of stop-down steps are calculated. Then, at a step S113, a display signal corresponding to the shutter speed and the aperture value calculated at the step S112 is output to the display driving circuit 35, and advance is made to a step S114. In response to the outputting of this display signal, the display driving circuit 35 causes the display device 37 to display the shutter speed and the aperture value.

On the other hand, if at the step S109, it is judged that the first timer time $t_1$ is equal to or greater than the power source maintaining time $\tau$, advance is made to a step S115, where the output port $O_1$ is changed from a high level to a low level, that is, the outputting of the power signal is stopped, and advance is made to a step S116. At the step S116, the first time counting is stopped, and then at a step S117, the first timer time $t_1$ is reset to 0 and return is made to the step S103. The transistor 19 is turned off by the stoppage of the outputting of the power signal, whereby the power supply to the circuits is cut off and therefore, the display of the aperture value and the shutter speed on the display device 37 is turned off.

Also, if at the step S110, it is judged that the input port $I_1$ is at a high level, it is judged that the main switch 15 is OFF, and advance is made to a step S118, where whether the first timer time $t_1$ is 0 is judged. If it is judged that the first timer time $t_1$ is not 0, advance is made to a step S119, where the output port $O_1$ is changed from a high level to a low level, that is, the outputting of the power signal is stopped, and advance is made to a step S120. At the step S120, the first time counting is stopped, and then at a step S121, the first timer time $t_1$ is reset to 0 and advance is made to a step S122. If at the step S118, it is judged that the first timer time $t_1$ is 0, advance is made directly to a step S122.

At the step S122, whether the second timer time $t_2$ is 0 is judged, and if it is judged that the second timer time $t_2$ is 0, return is made to the step S102, and if it is judged that the second timer time $t_2$ is not 0, advance is made to a step S123. At the step S123, the second time counting is stopped, and then at a step S124, the second timer time $t_2$ is reset to 0 and return is made to the step S102.

At the step S114, whether the release switch 29 is ON is judged from the state of the input port $I_3$, and if the input port $I_3$ is at a high level, it is judged that the release switch 29 is OFF, and return is made to the step S103, and if the input port $I_3$ is at a low level, it is judged that the release switch 29 is ON, and advance is made to a step S125.

According to the procedure hitherto described, when the light press switch 25 is closed by the half depression operation after the closing of the main switch 15, the power signal is output at the step S107 and the transistor 19 is turned on and the circuits become operable and also, the first time counting is started at the step S108. If thereafter, the main switch 15 is not opened and the release switch 29 is not closed, exposure calculation is effected at the step S112 and the exposure value is displayed at the step S113, and return is made to the step S103. If at the step S103, it is judged that the light press switch 25 is OFF, jump is made to the step S109, whereafter the exposure calculation and the display of the exposure value are continuedly effected until it is judged at the step S109 that the first timer time $t_1$ has become equal to the predetermined power source maintaining time $\tau$. That is, when the half depression of the release button is effected, even if the half depression is released thereafter, the power source is maintained and the display of the exposure value continues until the power source maintaining time $\tau$ elapses. This power source maintaining time $\tau$ is determined at a step which will be described later, but it is initially $\tau_0$ (a time of the order of 8 seconds) as described above.

When thereafter the first timer time $t_1$ reaches the predetermined power source maintaining time $\tau$, the step S109 is affirmed and therefore, the power signal is stopped (the step S115) and the power supply to the circuits is stopped and the display of the exposure value is released. Also, at this time, the first time counting is stopped (the step S116) and therefore, the step S111 is always affirmed and the calculation and display of the exposure value are not effected until thereafter the light press switch 25 is closed again. Further, when the main switch 15 is opened, the power signal is stopped and the first time counting is stopped.

Also, when the half depression of the light press switch 25 is released and the half depression thereof is again effected before the power source maintaining time $\tau$ elapses after the closing of the light press switch 25, the step S104 is affirmed and therefore, the first time counting till then is stopped (the step S105) and also, the first time counting is newly effected from 0 (the steps S106 and S108). Accordingly, when the half depression operation is continuedly performed or when the half depression operation/release is repetitively effected at a time interval shorter than the power source maintaining time, the power source is continuedly maintained.

If at the step S114, the closing of the release switch 29 is judged, at a step S125, a control signal is output to the exposure controller 39 and the diaphragm and the shutter are driven so as to provide the values of exposure factors such as the aperture value and the shutter speed or the number of stop-down steps calculated at the step S112, whereby photographing is effected.

Thereafter, at a step S126, a control signal is output to the film winding device 41 to wind up the film by one frame, and advance is made to a step S127. At the step S127, whether the second timer time $t_2$ is greater than 0, that is, whether the second time counting is being effected, is judged, and if the answer is negative, advance is made to a step S133, and if the answer is affirmative, the second time counting is stopped at a step S128, and advance is made to a step S129. The second timer time $t_2$ at this time is the photographing interval time from the preceding photographing till the current photographing.

At the step S129, the second timer time (photographing interval time) $t_2$ is added to the cumulative photographing interval time T hitherto to provide a new cumulative photographing interval time T. That is, the photographing interval time is cumulatively memorized. Then, at a step S130, the second timer time $t_2$ is reset to 0, and at a step S131, the number of times of time counting and photographing n is stepped by 1 and at a step S132, the number of times of counting L is counted up by 1, and advance is made to a step S133. At the step S133, the second time counting is started, and then at a step S134, whether the number of times of counting L is equal to or greater than a predetermined number of times $L_0$ is judged.

The predetermined number of times $L_0$ is a predetermined value and is any value such as 100, 200, 36, 24 or 1, and may be 1 or greater integer, and the setting of the power source maintaining time $\tau$ is effected at each predetermined number of times $L_0$.

If at the step S134, it is judged that the number of times of counting L is less than the predetermined number of times $L_0$, return is made to the step S103, and if it is judged that L is equal to or greater than the predetermined number of times $L_0$, advance is made to a step S135. At the step S135, an average photographing interval time obtained by dividing the cumulative photographing interval time T calculated at the step S129 by the number of times of time counting and photographing (the number of times over which the cumulative memorization has been effected) n is calculated, and this value is set to the power source maintaining time $\tau$ and is memorized. Then, at a step S136, the number of times of counting L is reset to 0, and return is made to the step S103.

According to the above-described procedure, when the release switch 29 is closed, photographing is effected at the step S125, and with this photographing, the second time counting is started at the step S133. When the next photographing (the current photographing) is then effected, the lapse time from the preceding photographing (the photographing interval time) is obtained from the result of the second time counting, and this photographing interval time is cumulatively memorized (the step S129).

Such processing is carried out each time photographing is effected, and when the number of times thereof reaches the predetermined value $L_0$, the step S134 is affirmed, and at the step S135, an average photographing interval time obtained by dividing the photographing interval time cumulatively memorized at the step S135 (the cumulative photographing interval time) by the number of times of time counting and photographing n is calculated. This average photographing interval time is set as the power source maintaining time $\tau$. Accordingly, thereafter, when the half depression operation is performed, even if that half depression operation is released, the power source is maintained until the power source maintaining time $\tau$ elapses.

Also, when photographing is effected some times after the setting of the power source maintaining time and the number of times thereof reaches the predetermined value $L_0$, the calculation of the step S135 is again effected and the power source maintaining time is renewed. When the main switch 15 is opened, the second time counting is stopped and the counted time thereof is not added to the cumulative photographing interval time.

As described above, the average photographing interval time is found from the photographing interval time during each photographing in the past and this is set as the power source maintaining time of the light press timer and therefore, there can be provided a power source maintaining time appropriate to any photographer. That is, in the case of a photographer who frequently effects photographing at short intervals while the main switch is ON, the power source maintaining time becomes correspondingly short, and conversely, in the case of a photographer who effects photographing at relatively long photographing intervals, the power source maintaining time becomes correspondingly long.

In the construction of the above-described embodiment, the microcomputer 11 constitutes the time counting device 101, the memory device 102 and the determining device 103.

Figure 4:
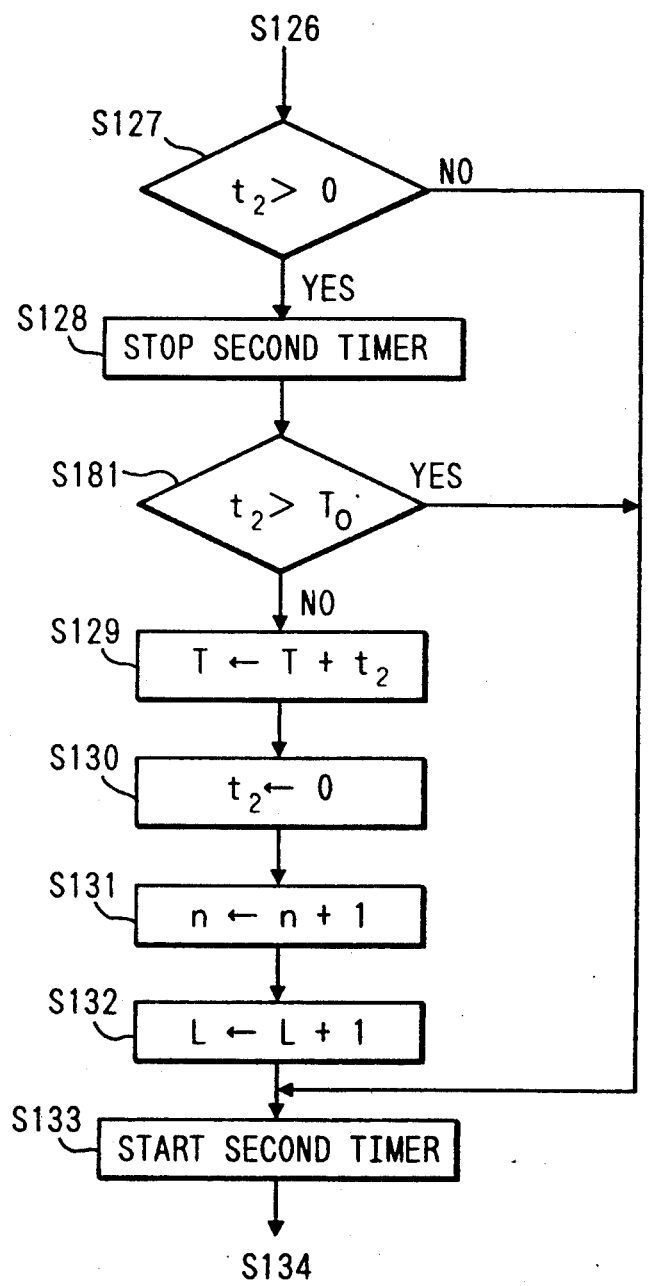

As shown, for example, in FIG. 4, a step S181 may be interposed between the steps S128 and S129, and the design may be such that if the step S181 is negated, advance is made to the step S129 and if the step S181 is affirmed, advance is made to the step S133. This step S181 is one for judging whether the second timer time $t_2$ exceeds a predetermined time $T_0$, and if it exceeds the predetermined time $T_0$, the steps S129–S132 are skipped. That in, the case where the counted time from the preceding photographing is too long, for example, where in spite of photographing having been terminated, the photographer has forgotten to open the main switch 15 the counted time should not to be considered to be the photographing interval time and therefore, in such case, the counted time is neglected and is not added to the cumulative photographing interval time.

Also, in the foregoing, the average photographing interval time calculated at the step S135 has been set as the power source maintaining time $\tau$, but for example, this average photographing interval time plus a time of the order of 10 seconds may be used as the power source maintaining time.

Further, although the average photographing interval time has been used as the power source maintaining time, a modification in which instead thereof, the most frequent photographing interval time is used as the power source maintaining time will now be described with reference to the flow chart of FIG. 5.

In the processing procedure of the present modification, the steps S127–S136 of FIG. 3B are replaced by the steps S151–S161 of FIG. 5 and the other portions are similar to those described above.

In FIG. 5, after the execution of the step S126 of FIG. 3B, advance is made to the step S151, where whether the second timer time $t_2$ is greater than 0 is judged. If the answer is negative, advance is made to the step S157, and if the answer is affirmative, advance is made to the step S152. At the step S152, the second time counting is stopped, and then at the step S153, in which of time ranges each divided into some sections the photographing interval time $t_2$ which is the second counted time is included is discriminated. This time range, except the maximum time range, may be set to equal intervals such as greater than 10 seconds and less than 20 seconds, greater than 20 seconds and less than 30 seconds, . . . , greater than one hour, or may be set to unequal intervals such as less than 10 seconds, greater than 10 seconds and less than 30 seconds, greater than 30 seconds and less than one minute, greater than one minute and less than two minutes, . . . .

The microcomputer 11 has counters corresponding to the divided time ranges, and at the next step S154, the count value (the number of times) of the time range discriminated at the step S153 is counted up by 1. Then, at the step S155, the second counted time $t_2$ is reset to 0, and at the step S156, the number of times of counting L is counted up by 1, and advance is made to the step S157. At the step S157, the second time counting is started, and then at the step S158, whether the number of times of counting L is equal to or greater than the predetermined number of times $L_0$ is judged.

If the step S158 is negated, return is made to the step S103 (FIG. 3A), and if the step S158 is affirmed, advance is made to the step S159. At the step S159, the count values of the respective time ranges are compared and the time range of maximum number of times is calculated, and then at the step S160, the representative time in this time range of maximum number of times (for example, the mean value of that time range) is set as the power source maintaining time $\tau$. Then, at the step S161, the number of times of counting L is reset to 0 and return is made to the step S103 of FIG. 3A.

According to the above-described procedure, the time which are most frequent of the photographer's photographing interval times in the past is calculated and this most frequent photographing interval time is regarded as the power source maintaining time. According to this, the time more suited for the photographer than the above-described average photographing interval time can be used as the power source maintaining time.

Second Embodiment

A second embodiment of the present invention will now be described with reference to FIGS. 6, 6A and 6B. The general construction of this embodiment is similar to that shown in FIG. 2, and differs only in the processing procedure of the microcomputer 11 from the first embodiment.

That is, in the first embodiment, from the photographing interval times, the average value thereof or the most frequent value thereof has been calculated and used as the power source maintaining time, while in the second embodiment, the average value of the photographing preparation times is used as the power source maintaining time. Here, the photographer, when effecting photographing, performs the half depression operation and on the basis of the exposure value displayed therewith, once releases the half depression operation and thereafter effects the adjustment of the exposure value. After the adjustment, the photographer performs the half depression operation again and subsequently performs the full depression operation (the release operation), thereby effecting photographing. In this case, the time from the above-mentioned first half depression operation until photographing is effected is the photographing preparation time.

Figure 6A:
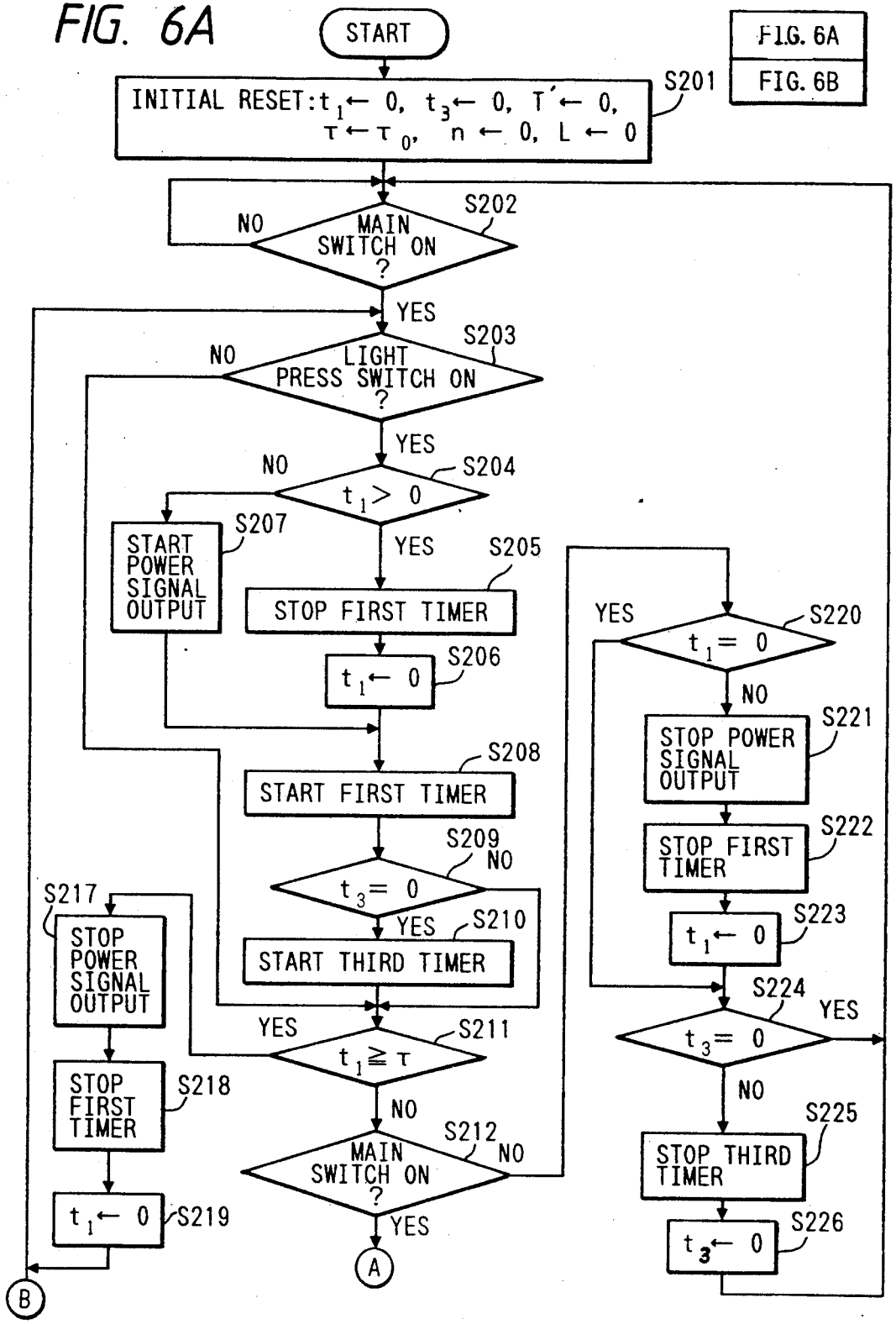
FIGS. 6A and 6B is a flow chart of the processing procedure of the second embodiment of the present invention.
Figure 6B:
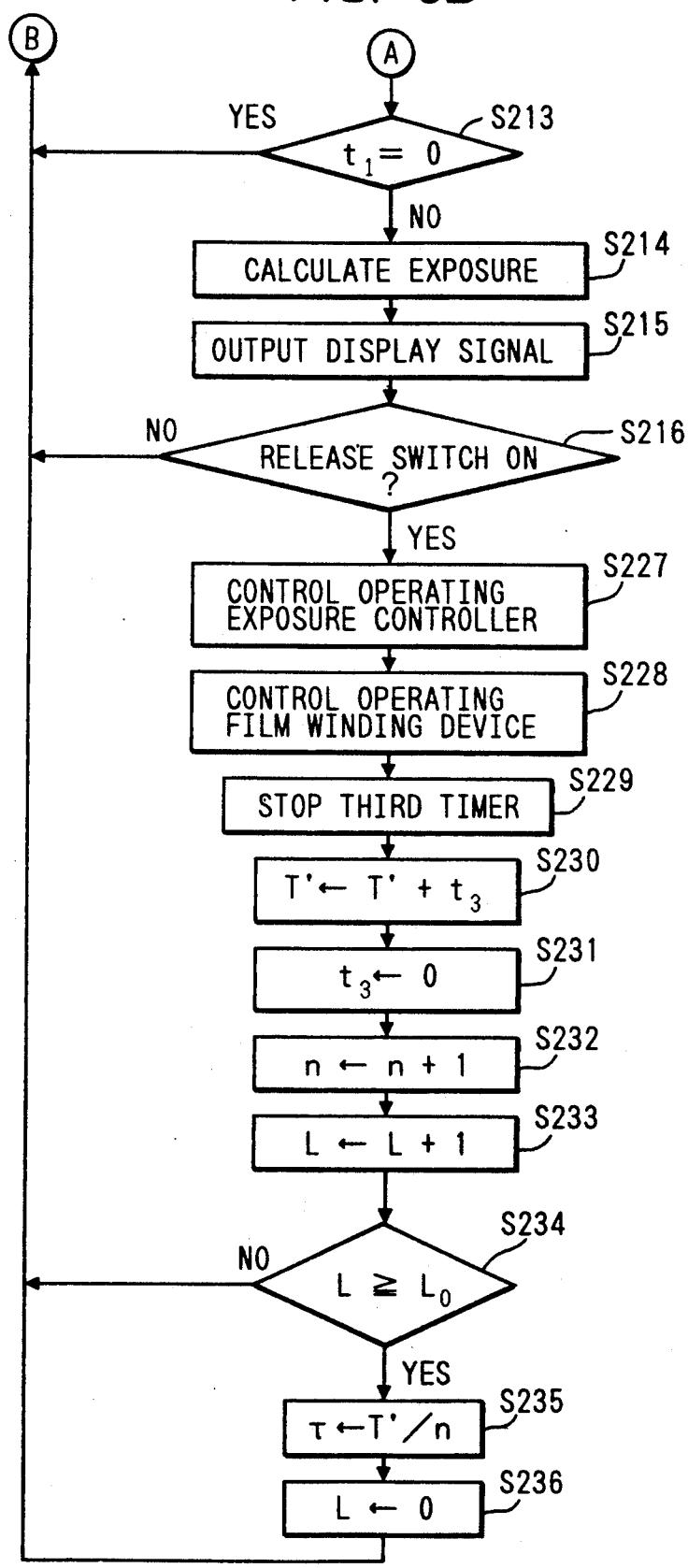

When the camera is loaded with the battery 13, the program of FIGS. 6, 6A, and 6B is started, and at a step S201, initial resetting is effected. That is, as described above, the first timer time $t_1$, the time T′, the number of times of time counting and photographing n and the number of times of counting L are reset to 0 and also the power source maintaining time $\tau$ is set to a predetermined time (e.g. the order of 8 seconds) $\tau_0$. Also, in the present embodiment, particularly the third timer time $t_3$ is reset to 0. The third timer time $t_3$ is the counted time for finding the photographing preparation time from after the light press switch is closed until photographing is effected. T′ is the cumulative value of the photographing preparation time.

Subsequently, the process of steps S202–S208 is carried out, but this process is similar to the process of the steps S102–S108 of FIG. 3A and therefore need not be described.

Thereafter, advance is made to a step S209, where whether the third timer time $t_3$ is 0 is judged, and if $t_3$ is 0, it is judged that the third time counting is not yet started and the photographing preparation (the half depression operation) is not done, and advance is made to a step S210. At the step S210, the third time counting is started, and then advance is made to a step S211. On the other hand, if at the step S209, it is judged that the third timer time $t_3$ is not 0, it is judged that the third time counting has been started and the photographing preparation has been done, and advance is directly made to a step S211. Steps S211–S223 are similar to the steps S109–S121 of FIGS. 3A and 3B.

At a step S224, whether the third timer time $t_3$ is 0 is judged, and if $t_3$ is 0, it is judged that the photographing preparation is not done, and return is made to the step S202, and if $t_3$ is not 0, advance is made to a step S225. At the step S225, the third time counting is stopped, and at a step S226, the third timer time $t_3$ is reset to 0 and return is made to the step S202. Steps S227 and S228 are similar to the steps S125 and S126 of FIG. 3B, and at a step S229, the third time counting started at the step S210 is stopped.

Subsequently, advance is made to a step S230, where the third timer time $t_3$ at this point of time (which is the photographing preparation time) is added to the cumulative photographing preparation time T′ till now to provide a new cumulative photographing preparation time, and at a step S231, the third timer time $t_3$ is reset to 0.

Then, at a step S232, the number of times of time counting and photographing n is counted up by 1, and at a step S233, the number of times of counting L is counted up by 1, and advance is made to a step S234. At the step S234, whether the number of times of counting L is equal to or greater than a predetermined number of times $L_0$ is judged, and if the answer is negative, return is made to the step S203, and if the answer is affirmative, advance is made to a step S235.

At the step S235, the cumulative photographing preparation time T' calculated at the step S230 is divided by the number of times of time counting and photographing n to thereby calculate the average photographing preparation time, and this value is set as the power source maintaining time $\tau$. Then, at a step S236, the number of times of counting L is reset to 0 and return is made to the step S203.

According to the above-described procedure, when the light press switch 25 is closed by the half depression operation after the closing of the main switch 15, at the step S207, a power signal is output to turn on the transistor 19 and the circuits become operable and also at the step S208, the first time counting is started and at the step S210, the third time counting is started.

As described above, even if the half depression operation is released, the power source is maintained until the predetermined power source maintaining time $\tau$ elapses (that is, until the step S211 is affirmed). Also, if the half depression operation is continued after the start of the third counting, or if the half depression operation is once released and then the half depression operation is performed again, the step S209 is negated after the step S203 has been affirmed and therefore, the third time counting is not newly started.

When the release switch 29 is closed thereafter, photographing and film winding-up are effected and then third timer time $t_3$ is cumulatively memorized as the photographing preparation time (step S230). When that number of times reaches the predetermined value $L_0$, the average photographing preparation time obtained by dividing the cumulative photographing preparation time T' by the number of times of time counting n is calculated at the step S235, and this is set as the power source maintaining time $\tau$.

According to this, in the case of a photographer who once performs the half depression operation and then effects exposure adjustment when the main switch 15 is ON and for whom the time until the next photographing is effected thereafter (the photographing preparation time) is relatively long, the power source maintaining time becomes correspondingly long, and on the other hand, in the case of a photographer for whom the photographing preparation time is short, the power source maintaining time becomes correspondingly short.

In the construction of the above-described embodiment, the microcomputer 11 constitutes the time counting means 201, the memory means 202 and the determining means 203.

Figure 7:
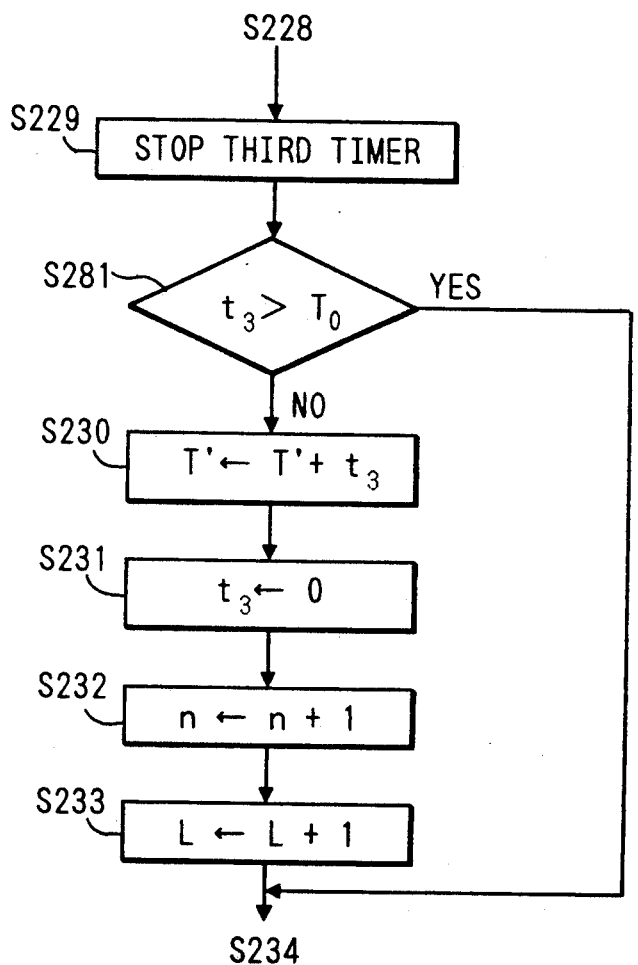

As shown, for example, in FIG. 7, a step S281 may be interposed between the steps S229 and S230 and the design may be such that if the step S281 is negated, advance is made to the step S230 and if the step S281 is affirmed, advance is made to the step S234. This step S281 is a step for judging whether the third timer time $t_3$ exceeds a predetermined time $T_0$, and if $t_3$ exceeds the predetermined time $T_0$, the steps S230-S233 are skipped. That is, in the case where the counted time after the half depression operation is too long e.g., where the photographer discontinued photographing after the half depression operation, but forgot to open the main switch 15, the counted time should not be considered to be the photographing preparation time and therefore, in such case, that counted time is neglected and is not added to the cumulative photographing preparation time.

In the foregoing, the average photographing preparation time calculated at the step S235 has been set as the power source maintaining time, but alternatively, the average photographing preparation time plus a time of e.g. the order of 10 seconds may be used as the power source maintaining time.

Further, although the average photographing preparation time has been used as the power source maintaining time, a modification in which instead thereof, the most frequent photographing preparation time is used as the power source maintaining time will hereinafter be described with reference to the flow chart of FIG. 8.

In the processing procedure of the present modification, the steps S229-S236 of FIG. 6B are replaced by the steps S251-S259 of FIG. 8 and the other portions are similar to those shown in FIGS. 6A and 6B.

In FIG. 8, after the execution of the step S228 of FIG. 6B, advance is made to a step S251, where the third time counting is stopped, and then at a step S253, in which of time ranges each divided into some sections the photographing preparation time $t_3$ which is the third timer time is included is discriminated. This time range may be set to equal intervals or unequal intervals, as previously described.

Then, advance is made to a step S253, where the count value (the number of times) of the time range discriminated at the step S252 is counted up by 1. Then, at a step S254, the third timer time $t_3$ is reset to 0, and at a step S255, the number of times of counting L is counted up by 1 and advance is made to a step S256. At the step S256, whether the number of times of counting L is equal to or greater than the predetermined number of times $L_0$ is judged, and if the answer is negative, return is made to the step S203 (FIG. 6A), and if the answer is affirmative, advance is made to a step S257. At the step S257, the count values of the respective time ranges are compared and the time range of the maximum number of times is found, and then at a step S258, the representative time in this time range of the maximum number of times (for example, the mean value of that time range or the like) is set as the power source maintaining time $\tau$. At a step S259, the number of times of counting L is reset to 0 and return is made to the step S203 of FIG. 6.

According to the above-described procedure, the time which is most frequent of the photographer's photographing preparation times in the past is found, and this most frequent photographing preparation time is used as the power source maintaining time. According to this, a time which is more appropriate to the photographer than the average photographing preparation time can be used as the power source maintaining time.

According to the invention of the first embodiment, the photographing interval time from the preceding photographing till the current photographing is calculated each time photographing is effected, and the power source maintaining time of the light press timer is determined on the basis of this photographing interval time and therefore, the power source maintaining time is the time best suited for the photographer. That is, in the case of a photographer for whom the photographing interval time is relatively long, the power source maintaining time becomes correspondingly long, whereby the phenomenon that the power source maintenance is released during exposure adjustment and the display of the exposure value is turned off becomes less often, and the usability of the camera is improved. On the other hand, in the case of a photographer for whom the photographing interval time is relatively short, the power source maintaining time becomes correspondingly short, whereby the phenomenon that the power source is unnecessarily maintained becomes less often, and the wasteful consumption of the power source can be minimized.

Also, according to the invention of the second embodiment, the photographing preparation time from the start of the half depression operation till photographing is calculated each time photographing is effected, and the power source maintaining of the light press timer is determined on the basis of this photographing preparation time and therefore, in the case of a photographer for whom the photographing preparation time is relatively long, the power source maintaining time becomes correspondingly long, and in the case of a photographer for whom the photographing preparation time is relatively short, the power source maintaining time becomes correspondingly short, and an effect similar to that described above is obtained.

We claim:

1. A camera including:
   photographing preparation operation means;
   timer means for maintaining a power source until a predetermined power source maintaining time elapses even if the power source is switched on by the operation of said photographing preparation operation means and the photographing preparation operation is released;
   time counting means responsive to photographing to start time counting;
   memory means for memorizing the photographing interval time from the preceding photographing till the current photographing on the basis of the content of said time counting means each time photographing is effected; and
   determining means for determining said predetermined power source maintaining time from said memorized photographing interval time.

2. A camera according to claim 1, wherein said determining means operates recurrently to calculate an average photographing interval time when the number of times of photographing since a prior calculation is equal to or greater than a predetermined number, and sets said average photographing interval time as said power source maintaining time, said average photographing interval time being calculated by dividing an accumulation of photographing interval times by the number of times photographing has been effected.

3. A camera according to claim 2, wherein said determining means adds a predetermined time to said average photographing interval time and defines the sum as said power source maintaining time.

4. A camera according to claim 2, further including inhibiting means for inhibiting said memory means from memorizing the photographing interval time conforming to the content of said time counting means when the time counted by said time counting means exceeds a predetermined time.

5. A camera according to claim 4, further including another counting means for counting the number of times of photographing since prior calculation of said average photographing interval time and wherein said memory means memorizes said counted number of times of photographing, and said inhibiting means inhibits said another counting means from counting the number of times of photographing when it inhibits said memory means from memorizing the photographing interval time.

6. A camera according to claim 5, which further comprises a main switch member, power applying means for actuating said timer means in response to the operation of said main switch member, and resetting means for resetting the content of said time counting means in response to the operation of said main switch member.

7. A camera according to claim 1, wherein said determining means operates recurrently to determine said power source maintaining time when the number of times of photographing since a prior determination is equal to or greater than a predetermined number, and wherein said determining means determines in which of several time ranges each photographing interval time is included, determines the time range having the maximum number of photographing interval times included therein, and sets a representative time in the last-mentioned time range as said power source maintaining time.

8. A camera including:
   photographing preparation operation means;
   timer means for maintaining a power source until a predetermined power source maintaining time elapses even if the power source is switched on by the operation of said photographing preparation operation means and the photographing preparation operation is released;
   time counting means for starting time counting with the start of said photographing preparation operation;
   memory means for finding the photographing preparation time from the start of said photographing preparation operation till photographing from the result of the time counting by said time counting means each time photographing is effected and memorizing it; and
   determining means for determining said predetermined power source maintaining time from said memorized photographing preparation time.

9. A camera according to claim 8, wherein said determining means operates recurrently to calculate an average photographing preparation time when the number of times of photographing since a prior calculation is equal to or greater than a predetermined number, and sets said average photographing preparation time as said power source maintaining time, said average photographing preparation time being calculated by dividing an accumulation of photographing preparation times by the number of times photographing has been effected.

10. A camera according to claim 9, further including inhibiting means for inhibiting said memory means from memorizing the photographing preparation time conforming to the content of said time counting means when the time counted by said time counting means exceeds a predetermined time.

11. A camera according to claim 10, further including another counting means for counting said number of times of photographing and wherein said memory means memorizes said counted number of times of photographing, and said inhibiting means inhibits said another counting means from counting the number of times of photographing when it inhibits said memory means from memorizing the photographing preparation time.

12. A camera according to claim 11, which further comprises a main switch member, power applying means for actuating said timer means in response to the operation of said main switch member, and resetting means for resetting the content of said time counting means in response to the operation of said main switch member.

13. A camera according to claim 9, wherein said determining means adds a predetermined time to said average photographing preparation time and defines the sum as said power source maintaining time.

14. A camera according to claim 8, wherein said determining means operates recurrently to determine said power source maintaining time when the number of times of photographing since a prior determination is equal to or greater than a predetermined number, and wherein said determining means determines in which of several time ranges each photographing preparation time is included, determines the time range having the maximum number of photographing preparation times includes therein, and sets a representative time in the last-mentioned time range as said power source maintaining time.

15. A camera including:
photographing preparation operation means;
timer means for maintaining a power source until a predetermined power source maintaining time elapses even if the power is switched on by the operation of said photographing preparation operation means and the photographing preparation operation is released;
time counting means for counting time in response to an operation with respect to photographing;
memory means for memorizing time on the basis of the content of said time counting means each time photographing is effected; and
determining means for determining said predetermined power source maintaining time from the time memorized by said memory means.

* * * * *